(12) United States Patent
Kitamura et al.

(10) Patent No.: US 7,714,466 B2
(45) Date of Patent: May 11, 2010

(54) CLAW-TEETH-TYPE ROTATING ELECTRICAL MACHINE

(75) Inventors: Masashi Kitamura, Mito (JP); Fumio Tajima, Hitachi (JP); Shigeru Kakugawa, Hitachi (JP); Yuji Enomoto, Hitachi (JP); Motoya Ito, Hitachinaka (JP); Ryoso Masaki, Hitachi (JP); Shoji Ohiwa, Saitama (JP); Chio Ishihara, Tokyo (JP)

(73) Assignees: Hitachi Industrial Equipment Systems Co., Ltd., Tokyo (JP); Hitachi Powdered Metals Co., Ltd., Matsudo-shi (JP); Japan Servo Co., Ltd., Tokyo (JP)

( * ) Notice: Subject to any disclaimer, the term of this patent is extended or adjusted under 35 U.S.C. 154(b) by 202 days.

(21) Appl. No.: 11/782,074

(22) Filed: Jul. 24, 2007

(65) Prior Publication Data

US 2008/0018195 A1    Jan. 24, 2008

(30) Foreign Application Priority Data

Jul. 24, 2006    (JP) .............................. 2006-200209

(51) Int. Cl.
*H02K 1/12* (2006.01)
*H02K 37/14* (2006.01)

(52) U.S. Cl. .............. 310/49.51; 310/49.37; 310/49.44; 310/257

(58) Field of Classification Search ............... 310/49 R, 310/156.08, 156.49, 156.54, 254, 257, 49.32–49.34, 310/49.37, 49.43, 49.44, 49.51, 49.53; *H02K 37/12, H02K 37/14*
See application file for complete search history.

(56) References Cited

U.S. PATENT DOCUMENTS 3,541,363 A * 11/1970 Vettermann et al. ....... 310/49 A
3,549,918 A * 12/1970 Van Hout .................. 310/49 R (Continued)

FOREIGN PATENT DOCUMENTS

CN    1255761    6/2000

(Continued)

OTHER PUBLICATIONS

Office Action in Chinese Patent Appln. Ser. No. 200710136921.0 (in Chinese) (7 pages); partial English language translation (3 pages), dated Jul. 17, 2009.

*Primary Examiner*—Tran N Nguyen
(74) *Attorney, Agent, or Firm*—Antonelli, Terry, Stout & Kraus, LLP.

(57) ABSTRACT

To realize reduction in vibration and noise while utilizing reluctance torque, a rotating electrical machine includes: a rotor having permanent magnets disposed in a cylindrical surface coaxial with a rotary shaft; and a stator having an annular stator core disposed coaxially with the rotary shaft, and a annular coil for magnetizing the stator core. The stator core has an annular part covering the annular coil, claws disposed at equal intervals in an inner radius surface of the annular part and extending axially, and magnetic gaps formed between neighboring claws. The number of claws is equal to the number of permanent magnets, and magnet flux in a direction orthogonal to a center axis of the magnetic pole of the permanent magnet at right angles in electric angle is larger than magnetic flux in the center axis direction generated between neighboring permanent magnets. Metal interpoles are provided between neighboring permanent magnets.

7 Claims, 8 Drawing Sheets

U.S. PATENT DOCUMENTS

| | | | |
|---|---|---|---|
| 4,714,850 A * | 12/1987 | Akiba et al. | 310/49 R |
| 6,153,953 A * | 11/2000 | Isozaki et al. | 310/49 R |
| 6,259,176 B1 * | 7/2001 | Isozaki et al. | 310/49 R |
| 6,744,156 B2 * | 6/2004 | Doi | 310/49 R |
| 6,765,321 B2 * | 7/2004 | Sakamoto | 310/49 R |
| 7,105,974 B2 * | 9/2006 | Nashiki | 310/185 |
| 2008/0218007 A1 | 9/2008 | Masuzawa et al. | |

FOREIGN PATENT DOCUMENTS

| | | |
|---|---|---|
| JP | 04138055 A * | 5/1992 |
| JP | 2667815 | 6/1997 |
| JP | 2004-153977 | 5/2004 |
| WO | WO 2006/064948 | 6/2006 |

* cited by examiner

CLAW-TEETH-TYPE ROTATING ELECTRICAL MACHINE

CLAIM OF PRIORITY

The present application claims priority from Japanese application Serial No. 2006-200209, filed on Jul. 24, 2006, the content of which is hereby incorporated by reference into this application.

FIELD OF THE INVENTION

The present invention relates to a claw-teeth-type rotating electrical machine using a stator in which a annular coil is covered and a plurality of claws are provided.

BACKGROUND OF THE INVENTION

A representative example of a rotating electrical machine effectively using a reluctance torque is a drive motor for a hybrid electric vehicle. At the low-speed rotation, the motor generates a large magnet torque by a strong rare-earth permanent magnet. At the time of high-speed rotation, the motor achieves high output by utilizing the reluctance torque while suppressing motor voltage by a weakening field.

A brushless electric motor having such functions is disclosed, including: a stator obtained by winding a distributed coil around a stator core formed by laminating electromagnetic steel sheets; and a rotor having a permanent magnet and a high-permeability magnetic member (auxiliary salient pole) (Japanese Patent No. 2,667,815 (Claim 1 and FIG. 1).

In the brushless electric motor, however, it is difficult to make the magnetic field distribution at the time of no load in the air gap have a sine wave shape, and the rotor has a complicated magnetic structure in the circumferential direction. Consequently, the electric motor generates electromagnetic exciting force in various modes. As a result, vibration and noise tend to occur in the motor. Since a wire is wound around the stator core obtained by laminating electromagnetic steel sheets, a coil end is inevitably formed and, due to the coil end, the axial length of the motor increases. Particularly, in a flat motor, the coil end hinders realization of miniaturization of the motor.

An object of the present invention is therefore to provide a claw-teeth-type rotating electric machine capable of realizing reduction in vibration and noise while utilizing reluctance torque.

SUMMARY OF THE INVENTION

To achieve the object, a claw-teeth-type rotating electrical machine of the present invention includes: a rotor in which a plurality of permanent magnets are disposed in a cylindrical surface coaxial with a rotary shaft; and a stator having a annular stator core disposed coaxially with the rotary shaft, and a coil for magnetizing the stator core. The coil is a annular coil obtained by winding a wire annularly. The stator core has a annular part covering the annular coil, a plurality of claws disposed at equal intervals in an inner radius surface of the annular part and extending in the axial direction, and a plurality of magnetic gaps formed between the neighboring claws. The number of the claws is equal to the number of permanent magnets, and magnet flux in a direction orthogonal to a center axis direction of the magnetic pole of the permanent magnet at right angles in electric angle is larger than magnetic flux in the center axis direction of the magnetic pole of the permanent magnet generated between the neighboring permanent magnets.

With the configuration, a reluctance torque is generated by the magnetic flux in the direction orthogonal to the center axis direction of the magnetic pole of the permanent magnet at right angles in electric angle. Since the number of claws is equal to the number of permanent magnets, the magnet torque and the reluctance torque are generated uniformly. In addition, an electromagnetic exciting force of low order is not generated, so that cyclic vibration is reduced. Therefore, noise and vibration is reduced. To make the magnetic flux in the direction orthogonal to the center axis direction of the magnetic pole of the permanent magnet in electric angles larger than that in the center axis direction generated between the neighboring permanent magnets, interpoles made of a metal are disposed between the neighboring permanent magnets.

The present invention provides a claw-teeth-type rotating electrical machine realizing reduction in vibration and noise while utilizing reluctance torque.

DETAILED DESCRIPTION OF PREFERRED EMBODIMENTS OF THE INVENTION

First Embodiment

A 24-pole claw-teeth motor (claw-teeth-type rotating electrical machine) as an embodiment of a claw-teeth-type rotating electrical machine of the present invention will be described below with reference to FIGS. 1 to 7.

Figure 1:
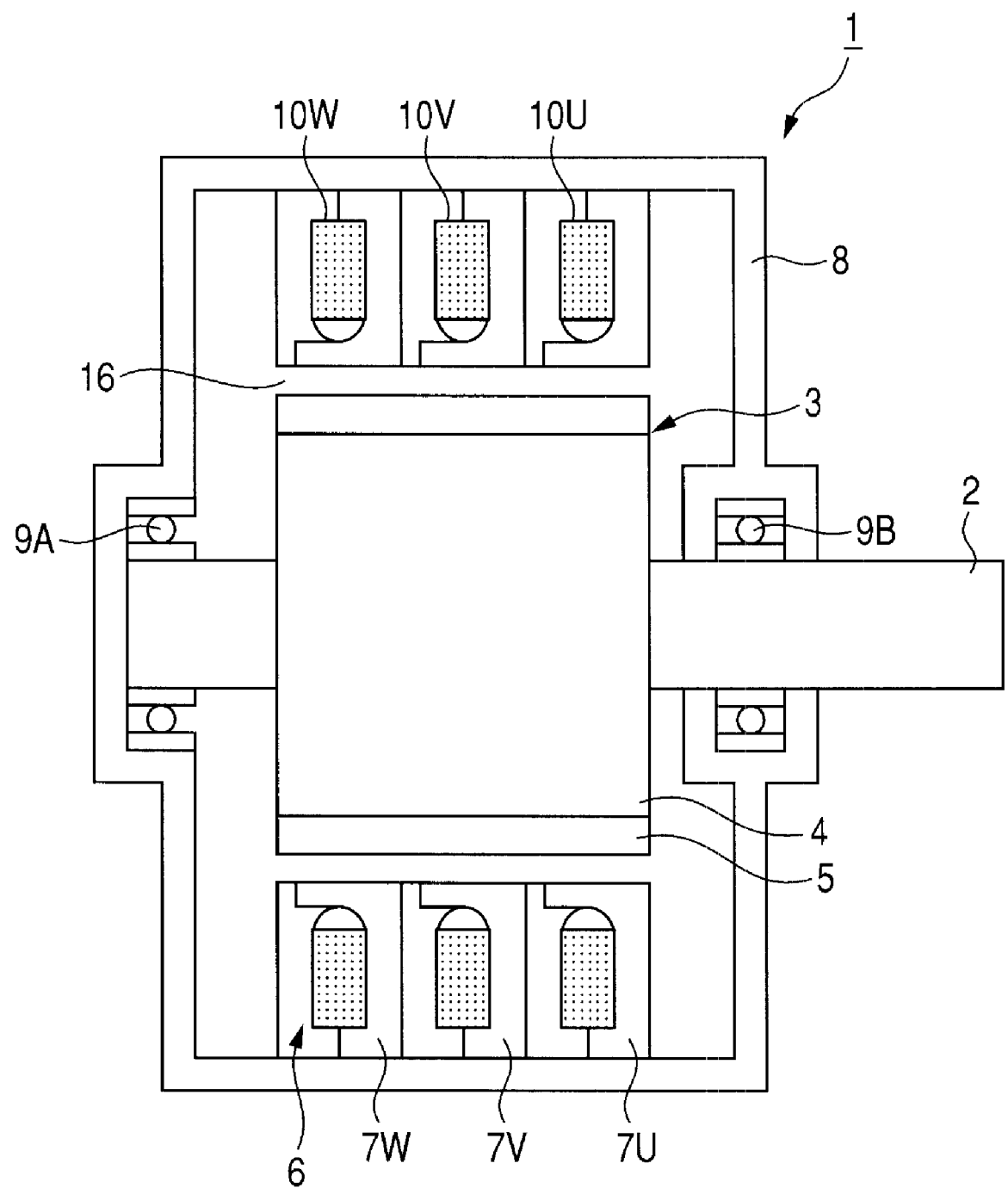
FIG. 1 is a cross section of a claw-teeth-type rotating electrical machine as an embodiment of the invention.

First, with reference to the configuration diagram of FIG. 1, the general configuration of the claw-teeth-type motor will be described.

A claw-teeth-type motor 1 has a rotor 3 in which rotary shaft 2 is inserted, a stator 6 disposed concentrically with the rotor 3 via an air gap 16, a stator frame 8, which supports the stator 6, and bearings 9A and 9B provided at both ends in the axial direction of the stator frame 8 and rotatably supporting the rotary shaft 2. The rotor 3 is constructed by a rotor core 4 formed concentrically with the rotary shaft 2, and a plurality of permanent magnets 5 fixed around the rotor core 4. The stator 6 is constructed by stator cores 7U, 7V, and 7W as stator magnetic cores and annular coils 10U, 10V, and 10W covering the stator cores 7U, 7V, and 7W, respectively. The stator core 7 is supported by the stator frame 8, and both ends in the axial direction of the stator frame 8 rotatably support the rotary shaft 2 via the bearings 9A and 9B.

Figure 2:
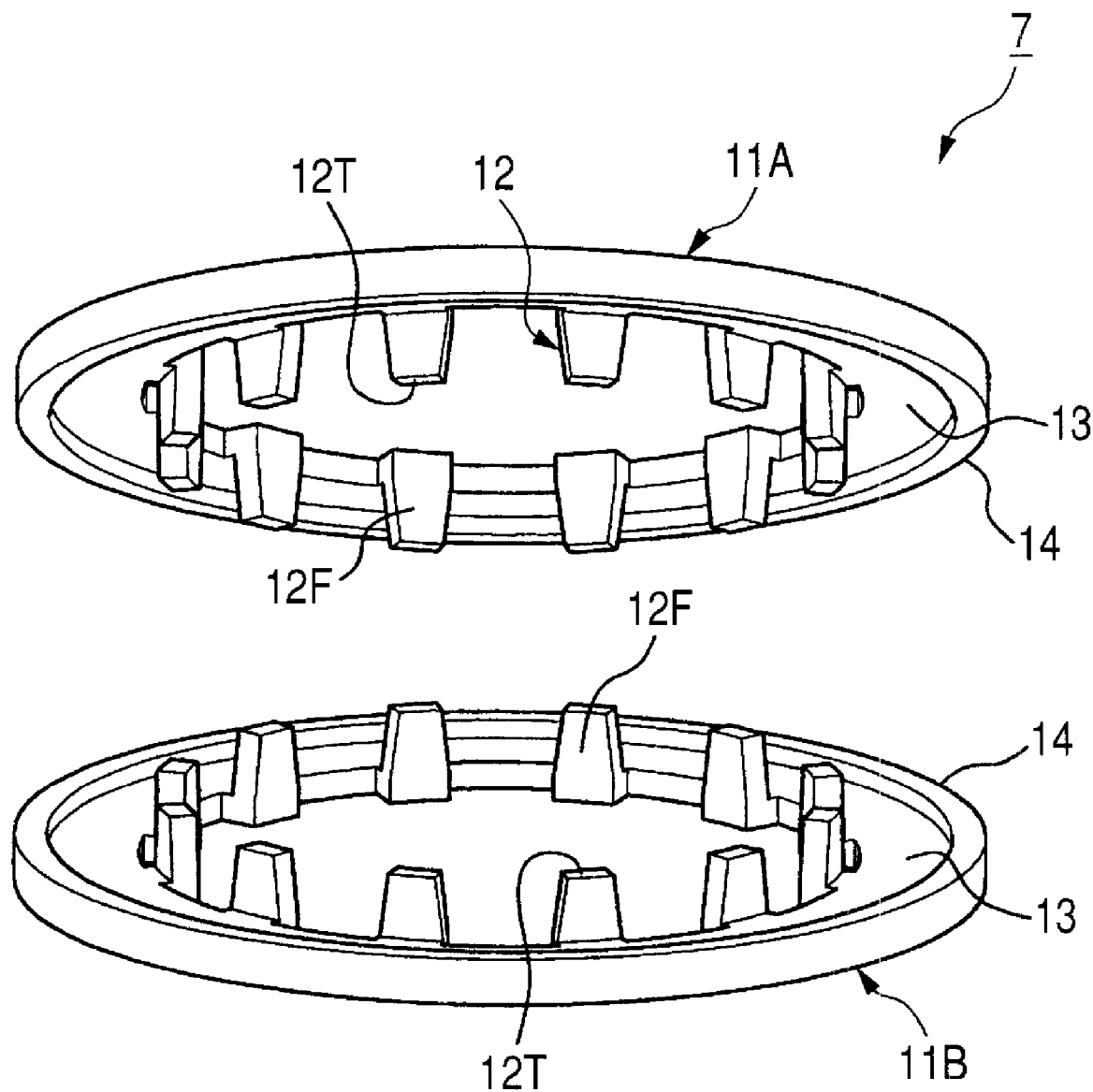
FIG. 2 is a perspective view of a claw teeth core as a component of a stator.

As shown in FIG. 2, the stator core 7 is made by claw teeth cores 11A and 11B. Each of the claw teeth cores 11A and 11B has: claws 12 projecting from the inner radius side, each having a magnetic pole face 12F, and extending in the axial direction; a annular yoke (annular part) 13 extending from the end of the claw 12 toward the outer radius side at right angles; and an outer yoke (annular part) 14 extending from the annular yoke 13 in the same direction as that of the claw 12. At the tip of the claw 12, an axial-extension end 12T is formed. Twelve claws 12 are formed at equal intervals in the circumferential direction. The claw teeth cores 11A and 11B are formed in the same shape by compacting iron powder with punches of die assembly, avoiding generation of eddy current by being coated with an insulating film. As compared with claw teeth cores obtained by laminating silicon steel plates (electromagnetic steel plates), a more complicated magnetic pole structure can be obtained.

Figure 3:
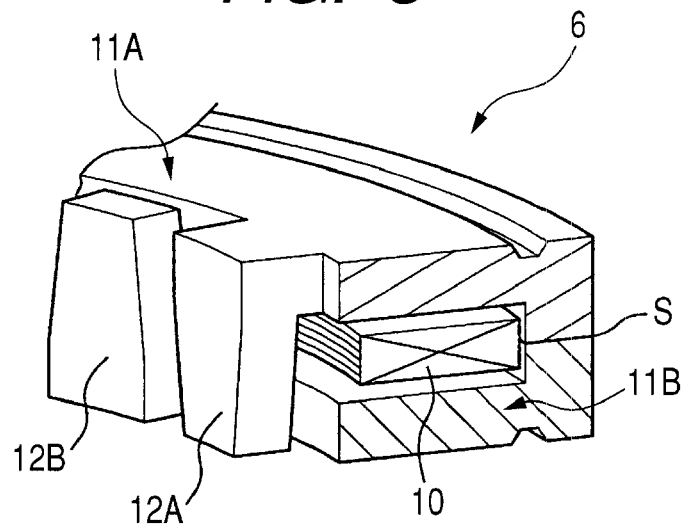
FIG. 3 is a perspective view of a part of the stator.

With reference to FIG. 3, the stator 6 will be described.

The stator 6 has the two annular claw teeth cores 11A and 11B made of soft magnetic material such as powder magnetic cores, and the annular coil 10 formed by winding a coated conductor wire annularly, and the overlapped two claw teeth cores 11A and 11B cover the annular coil 10. The claw teeth cores 11A and 11B obtained by compacting iron powder are disposed so that their claws 12 (12A and 12B) engage with each other. 24 magnetic pole faces 12F (refer to FIG. 2) concentric with the rotor 3 are formed along the peripheral face of the rotor 3.

As shown in FIG. 3, the periphery in cross section of each of the claw teeth cores 11A and 11B has an L shape, and the claw teeth cores 11A and 11B are stacked so that short sides S of their L shapes are in contact with each other. As a result, the cross section of the stator 6 has an almost rectangular shape. Further, the annular coil 10 is disposed in a space formed in the stator 6. A plurality of claws 12A and 12B each having a trapezoidal shape are formed so as to be apart from each other in the inner face of the claw teeth cores 11A and 11B.

The claw teeth cores 11A and 11B of the stator cores 7U, 7V, and 7W engage with each other, and the annular coils 10U, 10V, and 10W are held by the L-shaped periphery formed in the claw teeth core 11A and the L-shaped periphery formed in the claw teeth core 11B, thereby forming the stator 6.

The claw-teeth-type motor 1 (refer to FIG. 1) has a three-layer structure obtained by stacking the one-phase stator cores 7 (refer to FIG. 2) having therein the annular coils 10 (10U, 10V, and 10W) while shifting the position by 120 degrees in electric angle in the circumferential direction, that is, every 10 degrees (mechanical angle)=120 degrees (electric angle)/12 (the number of pole pairs). By molding the three stator cores 7U, 7V, and 7W with an insulating resin, the stator 6 in which the claw teeth cores 11A and 11B and the annular coil 10 are integrated can be obtained.

Figure 4:
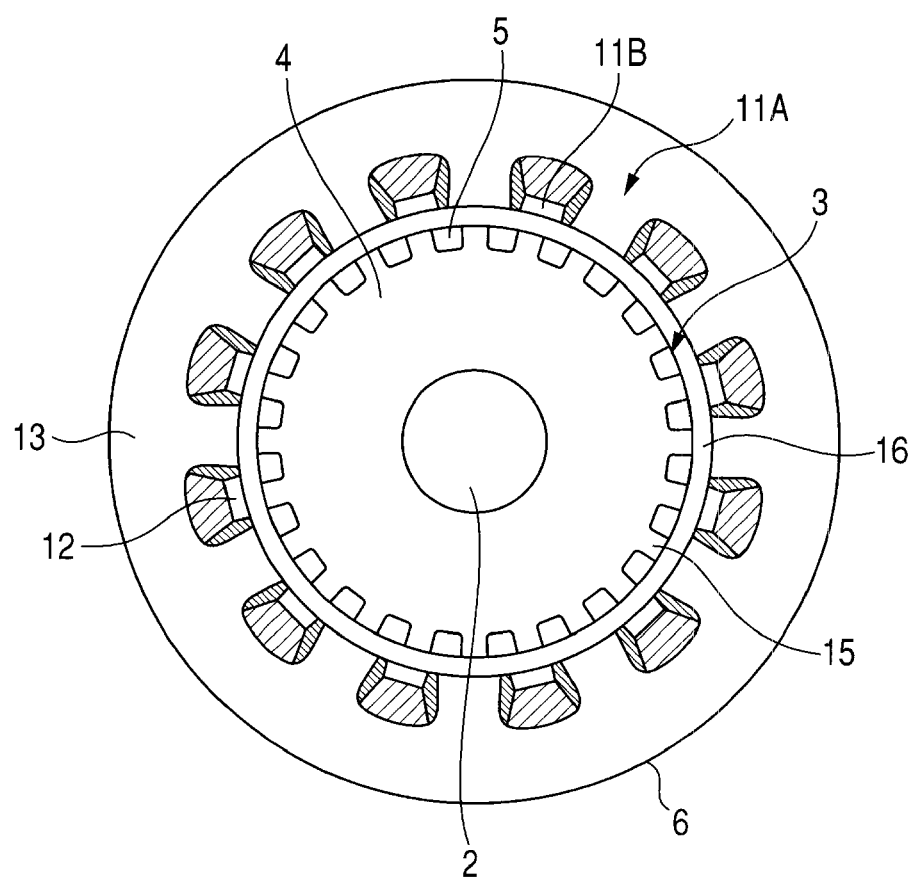
FIG. 4 is another cross section of the claw-teeth-type rotating electric machine as an embodiment of the invention.

FIG. 4 is a cross section in a plane perpendicular to the motor rotary shaft and including the annula yoke 13 of the claw teeth core 11A and the claws 12 of the claw teeth cores 11B.

The rotor 3 is formed by the rotary shaft 2, the rotor core 4 in which the rotary shaft 2 is fit, and the 24 permanent magnets 5 disposed at equal intervals in the outer peripheral surface of the rotor core 4. The structure is uniform in the axial direction. In the outer peripheral surface of the rotor core 4, interpoles 15 are formed at equal intervals in the circumferential direction. The permanent magnets 5 are bonded in recesses formed at equal intervals in the circumferential direction between the interpoles 15, and the opposite poles in the radial direction of the permanent magnets 5 are alternately arranged along the circumferential direction. The rotor 3 is rotatably held by using the bearings 9A and 9B concentrical with the stator 6 via the air gap 16. That is, the stator 6 faces the rotor 3 via the air gap 16.

In the embodiment, the number of claws 12 and the number of permanent magnets 5 are set to 24 which is a relatively large number. By setting the number of poles to a large number, the number of flux linkages per pole of the magnet decreases, and the thickness in the radial direction of the stator 6 can be reduced. Therefore, it is effective to miniaturize the motor. However, when the number of poles of the rotor 3 is set to be a large value, since the permanent magnets 5 are added, the number of manufacturing steps increases, and it causes increases in the cost. As a method of solving the problem, there is a method of manufacturing the rotor 3 by integrally compacting iron powder and magnet powder.

The operation of the claw-teeth-type motor 1 will be described.

First, magnetization of the claws 12 by applying alternating current to the annular coil 10 will be described. Next, generation of induced electromotive force in the annular coil 10 by rotation of the rotor 3 will be described.

Figure 5:
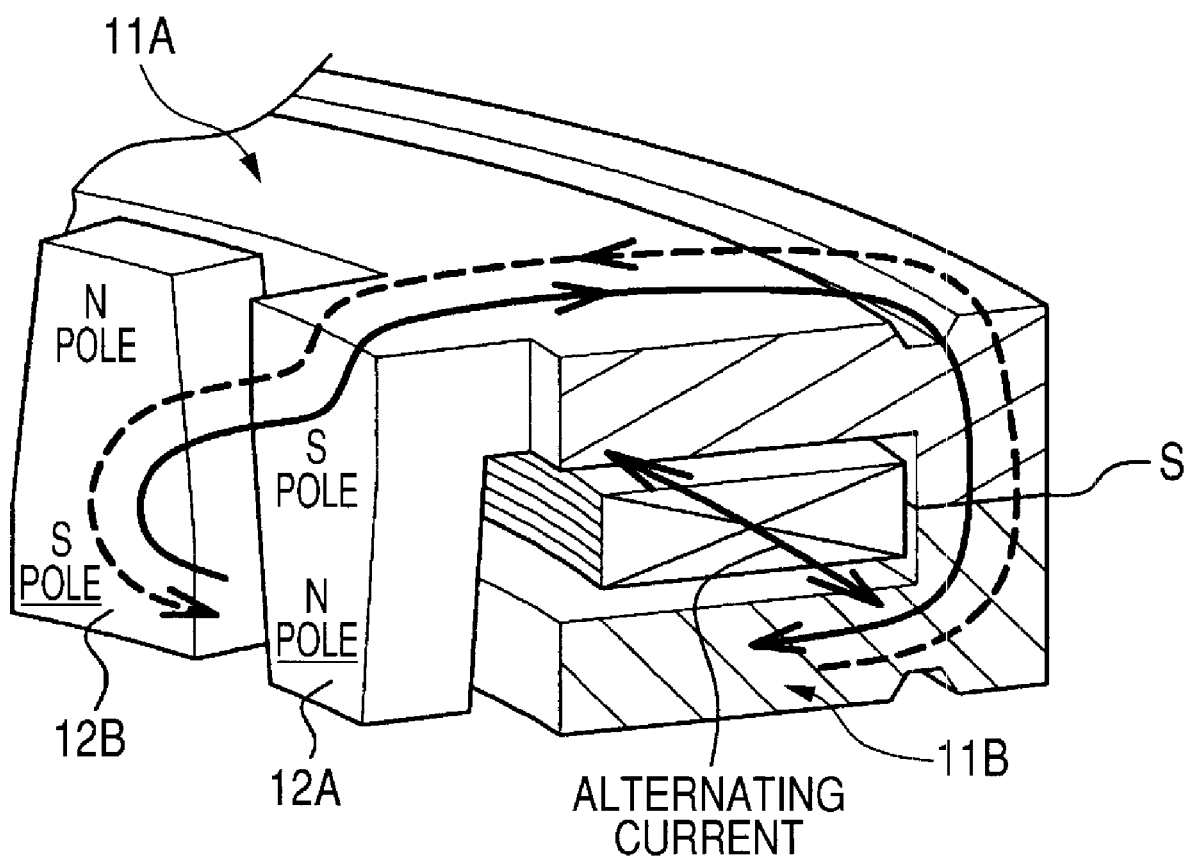
FIG. 5 is a diagram showing magnetization of the stator.

With reference to FIG. 5, a claw 12A provided for the claw teeth core 11A and a claw 12B provided for the claw teeth core 11B are arranged alternately in the inner radius face side, and an air gap is formed.

When sine wave alternating current is applied to the annular coil 10 of the stator 6, the magnetic flux in the direction according to the corkscrew rule is generated in a closed circuit made by the claw teeth cores 11A and 11B and the magnetic gap formed between the neighboring claws 12A and 12B. In the case of a magnetic flux flowing clockwise from the claw 12B to the claw 12A via the claw teeth cores 11A and 11B as shown by thick solid lines, the claw 12B is magnetized to the N pole, and the claw 12A is magnetized to the S pole (written in Gothic in FIG. 5). On the other hand, in case of a magnetic flux flowing counterclockwise from the claw 12A to the claw 12B via the claw teeth cores 11A and 11B as shown by thick broken lines, the claw 12A is magnetized to the N pole, and the claw 12B is magnetized to the S pole (written in Italic in FIG. 5).

The total number of the claws 12 of the stator core 7 is 24 (refer to FIG. 2). The claws 12 are disposed alternately as part of the claw teeth cores 11A and 11B and form a magnetic circuit. Consequently, each time the rotor 3 of 24 poles (12 pole pairs) rotates by 1/12 revolution, linkage occurs in the annular coils 10U, 10V, and 10W. That is, each time the rotor 3 rotates by 1/12 revolution, the number of flux linkages by the permanent magnet 5 changes by one cycle.

Therefore, each time the rotor 3 rotates by one rotation, an alternating current induced voltage of 12 cycles is generated in each of the annular coils 10U, 10V, and 10W. In addition, the stator cores 7U, 7V, and 7W are disposed while shifting the positions by 120 degrees in electrical angle in the circumferential direction in a three-layer structure, so that the induced voltage generated in each of the annular coils 10U, 10V, and 10W is a 3-phase alternating voltage. Therefore, by Y-connecting or Δ-connecting the annular coils 10U, 10V, and 10W to supply power from the 3-phase AC power supply and by detecting the pole position of the motor by proper means to control supply power, the motor can operate as a 3-phase synchronous motor.

Considering the operation of the motor from such a viewpoint, there is no large difference in operation theory between the claw-teeth-type motor of the embodiment and a slot-type rotary electrical machine in which a slot-type stator core 7 is formed by laminating the electromagnetic steel sheets (silicon steel sheets). However, when the detailed generation state of torques and electromagnetic forces is compared, the claw-teeth-type motor 1 is largely different from the slot-type rotating electrical machine.

Figure 6:
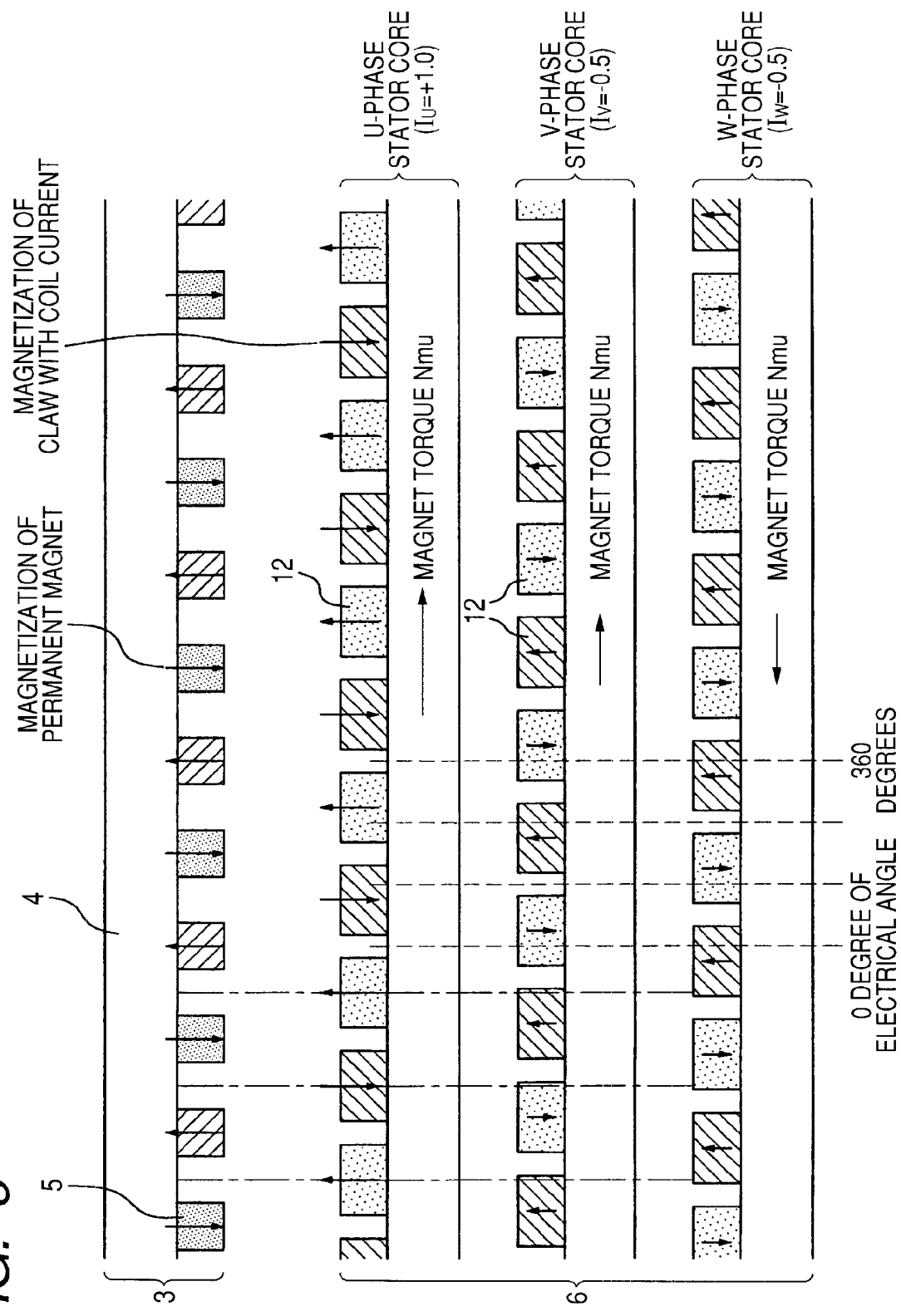
FIG. 6 is a diagram showing generation of a magnet torque.

FIG. 6 is a developed view of the rotor 3 and the stator 6 at certain time when the motor synchronously rotates while generating the maximum torque. In FIG. 6, to explain a magnet torque generation state so as to be easily understood, the interpoles 15 provided for the rotor 3 are not shown. In the developed view, time (position) at which the current of the U-phase stator core 7U becomes the maximum is chosen. The lower part in the developed view of the rotor 3 faces the air gap 16, and the upper part in the developed view of the stator 6 faces the air gap 16. In the stator 6, the stator cores 7U, 7V, and 7W of the U phase, V phase, and W phase, respectively, are disposed so as to be relatively shifted by 120 degrees in the electric angles.

The signs ↓ and ↑ shown in the developed view of the rotor 3 indicate magnetization vectors in the permanent magnet 5, and the signs ↓ and ↑ shown in the developed view of the stator 6 show magnetization vectors in the claws 12 generated by the currents in the annular coils 10U, 10V, and 10W. For example, since the current of the U-phase annular coil 10U is the maximum, when the magnitude of the U-phase current is +1.0, the V-phase current and the W-phase current is −0.5. In the diagram, the magnitudes of the current and the directions are reflected, and the magnetization vectors in the V-phase and W-phase claws 12 are shown rather small.

In FIG. 6, the generation state of magnet torques as interaction of magnetization vectors existing in the permanent magnets 5 and the claws 12 of the stator cores 7U, 7V, and 7W will be considered. Since the claws 12 of the U-phase stator core 7U are positioned between the permanent magnets 5 and the magnetization vector in the claw 12 is the maximum, it is known that the largest magnet torque Nmu acts in the U-phase stator core 7U. In the stator cores 7V and 7W of the other phases, small magnet torques Nmv and Nmw opposite to each other as shown in the diagram at the moment act, respectively. The generation manner of the magnet torques is a feature that a slot-type multi-phase rotating electrical machine does not have.

Specifically, the instantaneous magnet torques acting on the stator cores 7U, 7V, and 7W of the different phases largely vary, but the magnet torques acting in the claws 12 of the stator cores 7U, 7V, and 7W of the different phases are uniform. This phenomenon occurs when the number of the permanent magnets 5 of the rotor 3 and the number of the claws 12 are the same. The torque acting on the whole stator 6 is the sum of the magnet torques Nmu, Nmv, and Nmw of the stator cores 7U, 7V, and 7W of the different phases. As a whole, a rightward magnet torque acts on the stator 6. On the other hand, as the reaction, a magnet torque of the same magnitude and in the opposite direction acts on the rotor 3.

The above state is the generation state of the magnet torques at the moment (position) the motor generates the magnet torque most efficiently. At this moment, the phases of currents flowing in the annular coils 10U, 10V, and 10W (refer to FIG. 1) and the induced voltage are the same. The direction of current coincides with the q-axis direction in the theory of the rotating electrical machine. As time elapsed from the time shown in FIG. 6, the relative positions of the rotor 3 and the stator 6 change and the currents in the annular coils 10U, 10V, and 10W also change, so that the stator 6 in which the maximum magnet torque is generated changes like V phase, W phase, U phase, . . . in order.

When the magnet torque is considered by paying attention to synthetic magnetic field obtained by overlapping the magnetic fields of the 24 poles formed in the air gaps 16 of the stator cores 7U, 7V, and 7W, similarity with a slot-type rotating electrical machine is seen again.

When the number of poles of the motor is P, the alternating fields of the P poles generated by the stator cores 7U, 7V, and 7W of the different phases are proportional to the currents in the annular coils 10U, 10V, and 10W. Since the phase is determined according to the relative positions of the stator cores 7U, 7V, and 7W, the alternating fields generated in the air gap 16 by the stator cores 7U, 7V, and 7W of the U, V, and W phases are proportional to $\cos[\omega^*t]^*\cos[n^*\theta]$ (where n (=P/2) denotes the number of pole pairs, and ω indicates frequency (angular velocity) of the power supply), $\cos[\omega^*t-2^*Pi/3]^*\cos[n^*(\theta-2^*Pi/3/n)]$, and $\cos[\omega^*t-4^*Pi/3]^*\cos[n^*(\theta-4^*Pi/3/n)]$, respectively. Although the detailed calculation will not be described here, the synthetic magnetic field of the alternating fields is $1.5^*\cos[n^*\theta-\omega^*t]$.

It is therefore understood that when the alternating fields of the P pole of the stator cores 7U, 7V, and 7W of the different phases are overlapped, the rotating magnetic field of the P pole is obtained and the motor rotates at an angular frequency (angular velocity) ω/n. When it is estimated that the magnetic field interacts with the rotor 3 having an uniform structure in the axial structure to generate a torque, the magnet torque acting on the whole stator 6, that is, the sum of the magnet torques Nmu, Nmv, and Nmw is the same as that in a slot-type rotating electric machine. With this estimation, however, the detailed mechanism of generation of the magnet torque in the claw-teeth-type motor 1 cannot be explained.

Figure 7:
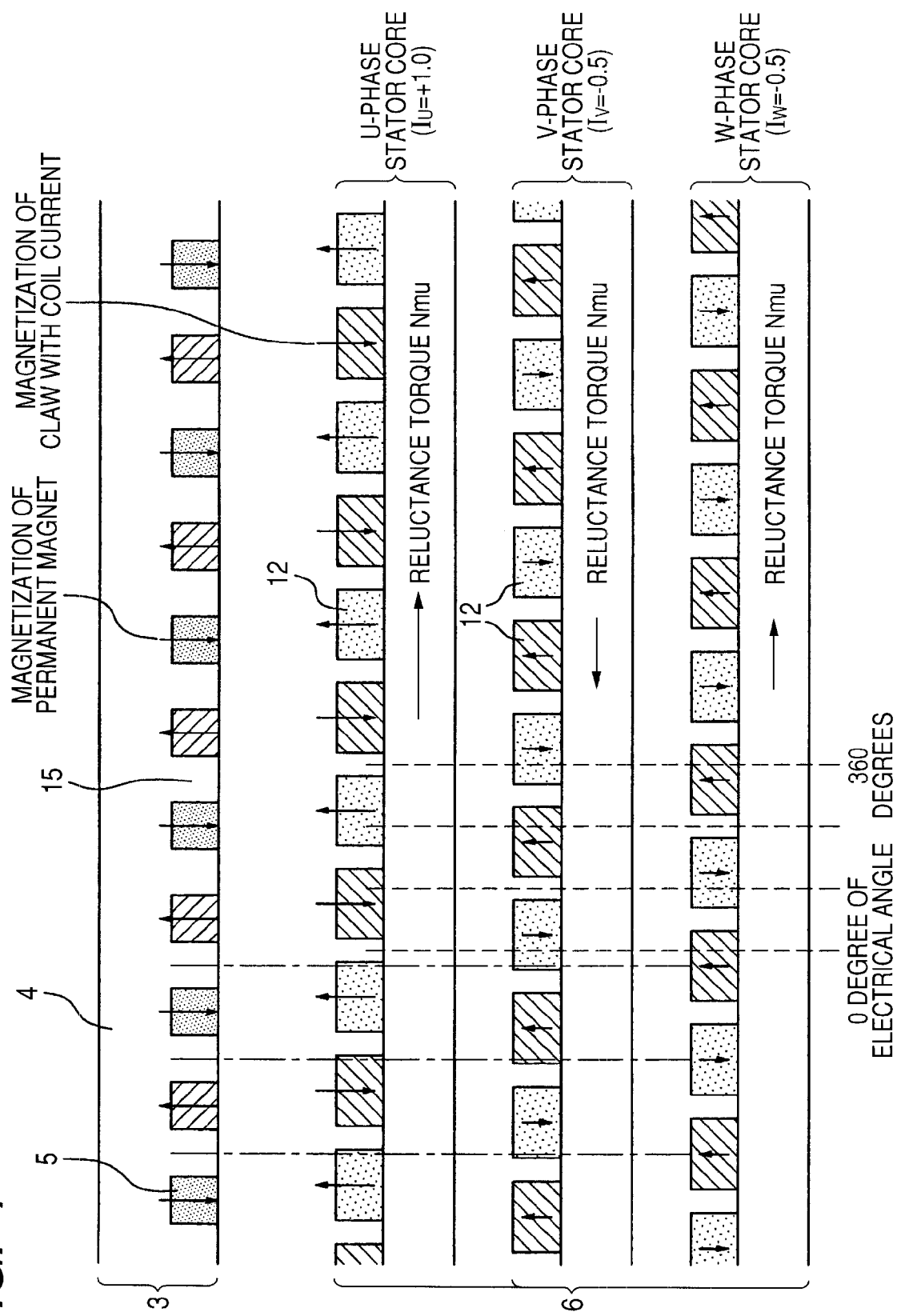
FIG. 7 is a diagram showing generation of a reluctance torque.

FIG. 7 is a developed view of the motor like FIG. 6 and shows that reluctance torque is effectively generated also in the claw-teeth-type motor 1. FIG. 7 shows the interpoles 15 which are not shown in FIG. 6. FIG. 7 shows the state at the moment (positional relation) at which the current of the annular coil 10U becomes the maximum in a manner similar to FIG. 6. At the moment, the reluctance torque is generated most effectively. Consequently, although the current phase coincides with the q-axis direction in FIG. 6, the current phase in FIG. 7 advances from the q-axis direction by about 45 degrees in the electrical angle. Therefore, the position of the rotor 3 and that of the stator 6 are slightly deviated from those of FIG. 6 at the moment the U-phase current becomes the maximum.

In FIG. 7, as the interaction of the magnetization vectors generated in the interpoles 15 provided for the rotor 3 and the claws 12 of the stator cores 7U, 7V, and 7W, reluctance torques are generated. Generation of the reluctance torques will be considered. Since the magnetization vectors in the claws 12 of the stator core 7 of the U phase are the maximum and the interpoles 15 are in positions where attraction can be performed efficiently, it is understood that the largest reluctance torque acts on the stator core 7U of the U phase. On the stator cores 7V and 7W of the other phases, small reluctance torques in the directions opposite to each other as shown in the diagram act.

The generation manner of the reluctance torque is a unique feature that a slot-type multiphase rotating electrical machine does not have. Specifically, instantaneous reluctance torques acting on the stator cores 7U, 7V, and 7W of the different phases largely differ from each other, and the reluctance torques acting on the claws 12 provided for the stator cores 7U, 7V, and 7W of the different phases are uniform. The reluctance torque acting on the whole stator 6 is the sum of the reluctance torques Nru, Nrv, and Nrw of the stator cores 7U, 7V, and 7W of the different phases. As a whole, a rightward reluctance torque acts on the stator 6, which is the same direction as that of the above-described magnet torque. On the other hand, as the reaction, a reluctance torque of the same magnitude and in the opposite direction acts on the rotor 3.

The above state is the generation state of the reluctance torques at the moment (position) the claw-teeth-type motor 1 generates the reluctance most efficiently. At this moment, the phases of currents flowing in the annular coils 10U, 10V, and 10W advance from the q-axis direction by about 45 degrees in electric angle. The q-axis direction is a direction electrically orthogonal to the center axis direction of the magnetic pole of the permanent magnet 5. As time elapses from the time shown in FIG. 7, the relative positions of the rotor 3 and the stator 6 change and the currents in the annular coils 10U, 10V, and 10W also change, so that the stator core 7 in which the maximum reluctance torque is generated changes like V phase, W phase, U phase, . . . in order.

As described above, the generation manner of the reluctance torque is largely different from that of a slot-type rotating electrical machine. However, from the standpoint of paying attention to the rotating magnetic field of the P pole obtained by overlapping the alternating magnetic fields generated by the stator cores 7U, 7V, and 7W, the reluctance torque acting on the whole stator 6, that is, the sum of Nru, Nrv, and Nrw can be handled as the one similar to that of the slot-type rotating electrical machine. That is, it is known that, according to the theory of the rotating electrical machine, when inductance related to a magnetic flux φd along the center axis direction of the magnetic pole of the permanent magnet 5 is Ld and inductance related to a magnetic flux φq in the direction orthogonal to the magnetic flux φd is Lq, the reluctance torque is proportional to (φq-φd), that is, (Lq-Ld).

Figure 8:
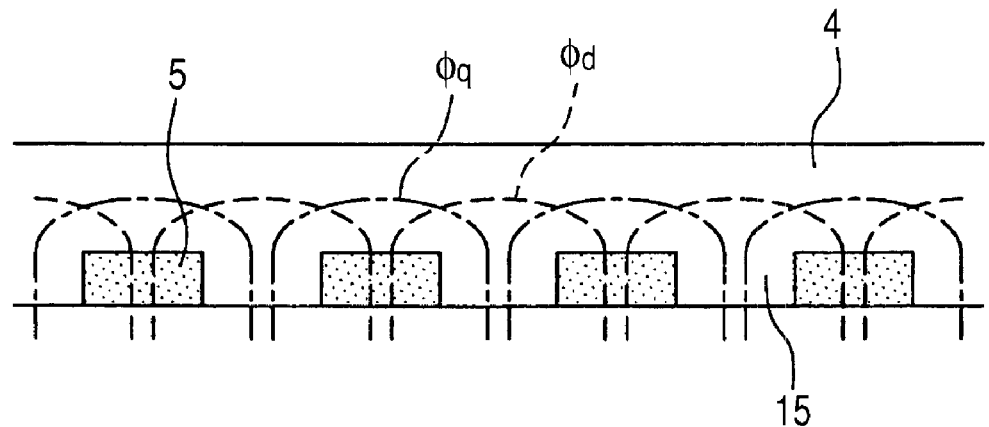
FIG. 8 is a developed view of a rotor showing magnetic circuits related to a magnetic flux $\phi_q$ in the q-axis direction and a magnetic flux $\phi_d$ in the d-axis direction.

FIG. 8 shows the magnetic fluxes φd and φq illustrated in the developed view of the rotor 3 of the embodiment. Since the permanent magnets 5 are disposed in positions blocking the magnetic flux φd, it is understood that the relation (Lq-Ld)>0 is satisfied and, therefore, the reluctance torque is generated in the whole motor. The property satisfying Lq>Ld is called inverse saliency. As another configuration having the inverse saliency, there is a configuration that the permanent magnets 5 are buried in the rotor core 4.

Next, the generation state of electromagnetic exciting force in the motor will be described.

In the slot-type rotating electrical machine, the stator 6 and the rotor 3 have a structure uniform in the axial direction of the motor, so that the electromagnetic exciting force almost uniform in the axial direction acts on the stator core 7. The electromagnetic exciting force is overlapping of traveling waves in the circumferential direction having various spaces and time orders. When the electromagnetic exciting force is divided into components in the radial direction and components in the circumferential direction, the former components in the radial direction easily cause vibration and noise of the motor for the reason that the components in the radial direction tend to be connected to cyclic vibration in the stator core 7 and the stator frame 8.

It is known that when the number of poles of the motor is P, in the slot-type rotating electrical machine, electromagnetic exciting forces in many modes are generated also at a relatively low order between the space zeroth order and the space P-th order. In particular, in a slot-type rotating electrical machine utilizing the reluctance torque, the electromagnetic exciting forces at various orders are generated for reasons such that the magnetic field distribution at the time of no load in the air gap 16 is not easily formed in a sine wave and the rotor 3 has a complicated magnetic structure in the circumferential direction. For such reasons, the motor vibrates annularly and, in some cases, vibration and noise becomes considerably large.

In contrast, in the claw-teeth-type motor 1 of the embodiment, the magnetic fields generated in the air gaps 16 by the stator cores 7U, 7V, and 7W of the different phases have standing wave of the P pole, and the rotor 3 generates a rotating magnetic field of the P pole. The electromagnetic exciting force which can be generated due to the magnetic fields is generated at a space zeroth order, a space P-th order, space P-th order, and 2P-th order, and the like which is the order of multiples of P. Like the place where the maximum magnet torque and the maximum reluctance torque is generated shifts to U phase, V phase, W phase, U phase, . . . , and the stator core 7 in order, the electromagnetic exciting force shifts to the neighboring stator core 7 with time and propagates among the stator cores 7U, 7V, and 7W of the different phases like traveling waves in the axial direction.

When the electromagnetic exciting force generation state in the claw-teeth-type motor 1 of the embodiment and that in the slot-type rotating electrical machine are compared with each other, the feature deserving special note of the claw-teeth-type motor 1 is that the space order of the electromagnetic exciting force can be set to be sufficiently large. For example, when the number of poles of the slot-type rotating electrical machine is 8, electromagnetic exciting force of the nonzero space order of 8 or less is generated. On the other hand, in the claw-teeth-type motor 1, the lowest space order (nonzero) of the electromagnetic exciting force is 24.

Generally, deformation of the stator core 7 and the stator frame 8 is suppressed with respect to the electromagnetic exciting force of a large space order, so that the amplitude of vibration can be suppressed. Therefore, the feature that the space order of the electromagnetic exciting force can be set to a large value is very advantageous from the viewpoint of reduction in vibration and noise. For the above reasons, in the claw-teeth-type motor 1 of the embodiment, the reluctance torque can be also utilized in addition to the magnet torque and, further, vibration and noise of the motor can be largely reduced. In other words, the claw-teeth-type motor 1 does not have a coil end as a cause of increasing the axial length of the motor. Thus, a small-sized motor with a simple configuration can be realized. By use of the reluctance torque, a motor output at the time of high rotation can be improved, and vibration and noise can be largely reduced.

With respect to the generation manners of the magnet torque, reluctance torque, and electromagnetic exciting force, the claw-teeth-type motor 1 of the embodiment and the slot-type rotating electrical machine are considerably different from each other. However, with respect to macro characteristics (generation of the sum of torques) of a polyphase motor, as described above, the claw-teeth-type motor 1 of the embodiment can be handled in a manner similar to the slot-type rotating electrical machine. By using a vector diagram, the voltages and currents in the claw-teeth-type motor 1 will be described more specifically.

Figure 9:
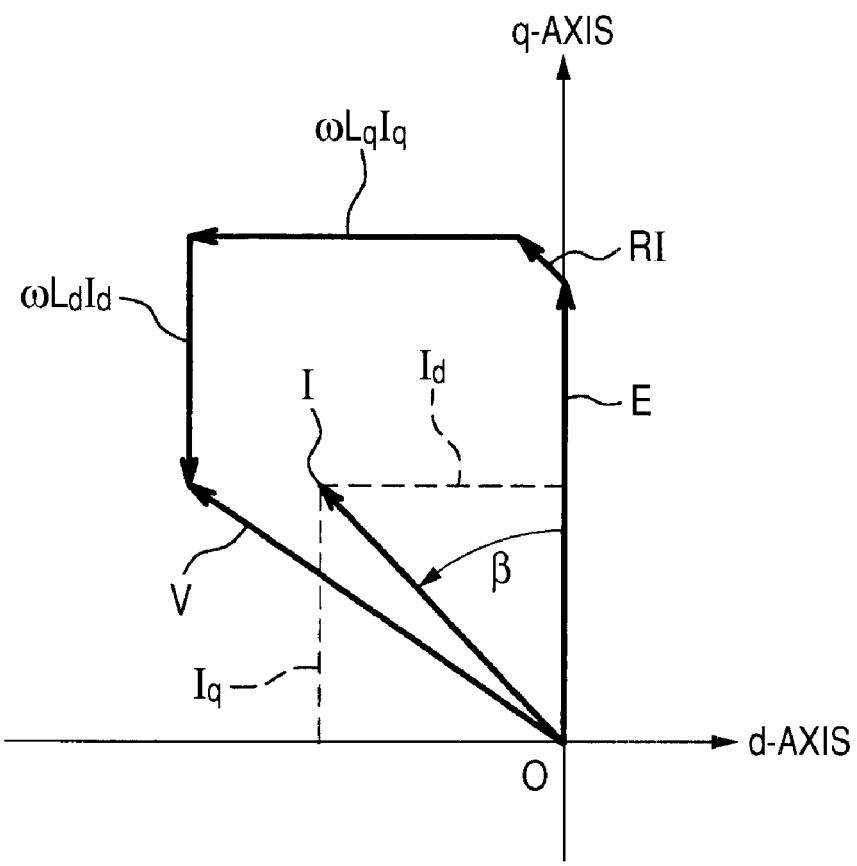
FIG. 9 is a vector diagram showing a state where the reluctance torque is generated.

FIG. 9 is a vector diagram paying attention to a certain phase. The vector diagram shows the operating state of the motor described with reference to FIG. 7. The components of current I are expressed as Iq and Id, and phase voltage V is equal to the vector sum of phase induced voltage E, a voltage drop RI due to coil resistance R, and voltage drops ωLqIq and ωLdId by inductance. The lead angle of the current I described above with reference to FIG. 7 is expressed as β in the diagram. By making β advance by about 45 degrees in electric angle, the phase voltage V can be suppressed to become relatively small. At this time, the reluctance torque is simultaneously generated, so that decrease in the magnet torque caused by decrease in the current components in the q-axis direction can be compensated. Such an operation manner is called a weakening magnetic field and is often used in a drive motor for a hybrid electric vehicle. That is, the claw-teeth-type motor 1 can efficiently generate torque while suppressing the voltage of the motor, so that relatively large torque can be generated to a high-speed rotation area of the motor.

The characteristics of the motor are particularly effective in the case where the power supply voltage is relatively low and, simultaneously, a large output has to be generated. In this case, significantly large current has to be passed to the motor. Consequently, due to wiring resistance in some midpoint and a voltage drop in an inverter and the like, the voltage supplied to the motor becomes much smaller, so that the weakening magnetic field becomes important. For example, as a member using a low-voltage power supply such as a battery as an energy supply source, an electronic water pump for a vehicle, a motor for an oil pump, a motor for electronic power steering, a motor for electric brake, and the like are suitable as applications of the claw-teeth-type motor 1 of the embodiment. In the applications, miniaturization of the motor is also important, and the feature of the claw-teeth-type motor 1 having no waste space of the coil end and the like can be utilized.

Second Embodiment

Figure 10:
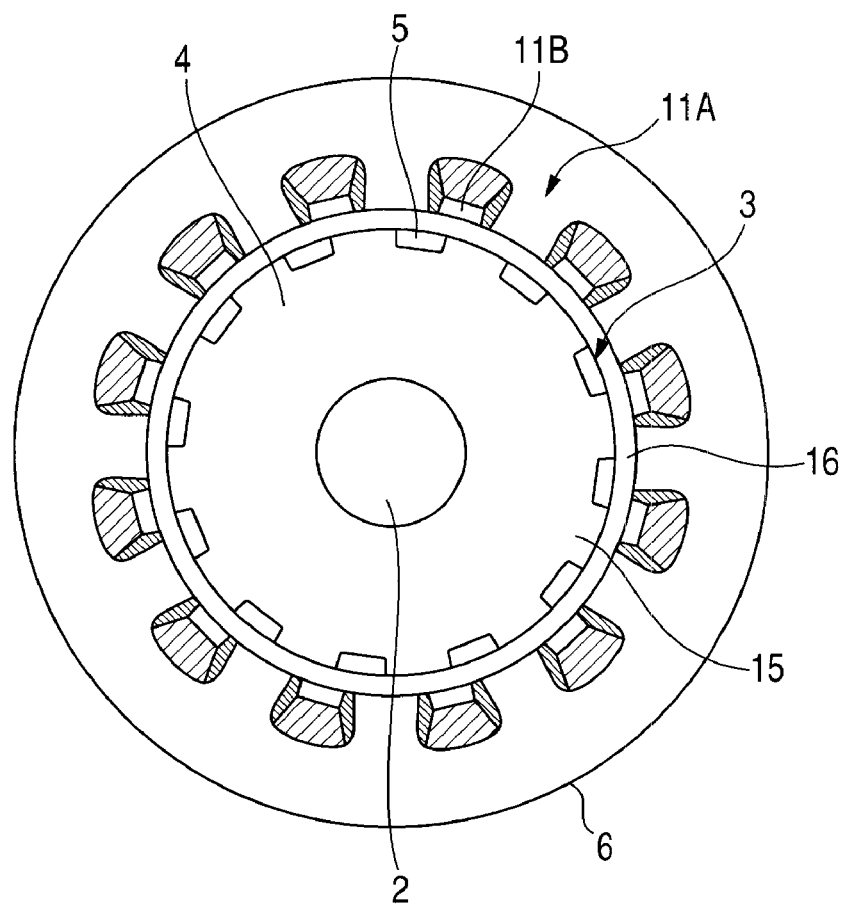
FIG. 10 is a cross section of a claw-teeth-type rotating electrical machine in a second embodiment.

FIG. 10 shows a second embodiment of the claw-teeth-type motor of the present invention. The same stator 6 as that of the first embodiment is used. However, the number of permanent magnets 5 in the rotor 3 is 12 which is the half of that of the first embodiment, and the 12 interpoles 15 are formed at equal intervals along the circumferential direction in the outer periphery of the rotor core 4. In the first embodiment, the permanent magnets 5 in the radial direction are bonded while the polarity is alternatively inverted. In the second embodiment, the permanent magnets 5 in the radial direction are disposed while all of their polarities are in the same direction. With such a configuration, the interpoles 15 between the permanent magnets 5 operate as virtual magnetic poles, and the rotor 3 of 24 poles can be formed by the 12 permanent magnets 5.

Figure 11:
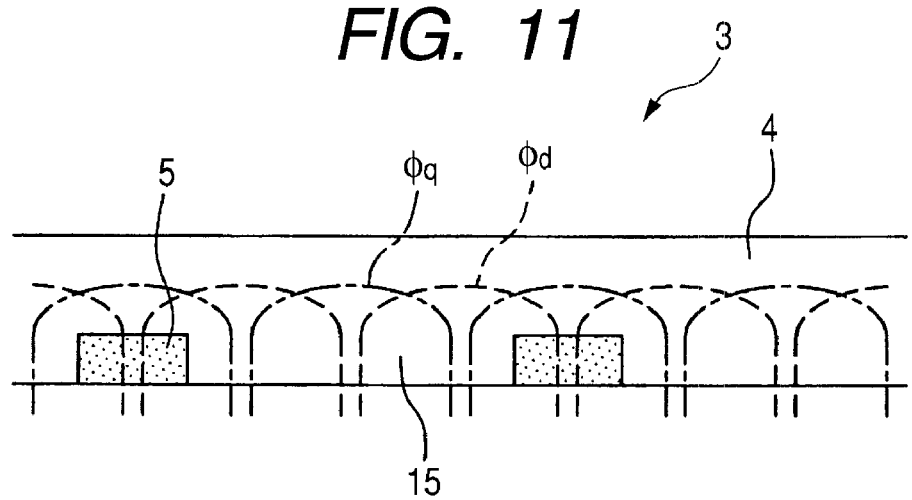
FIG. 11 is a developed view of a rotor showing magnetic circuits related to the magnetic flux $\phi_q$ in the q-axis direction and the magnetic flux $\phi_d$ in the d-axis direction in the second embodiment.

FIG. 11 is a developed view of the rotor 3 in the second embodiment. When a magnetic circuit of the magnetic flux φq in the q-axis direction and that of the magnetic flux φd in the d-axis direction are compared with each other, the permanent magnets 5 are disposed so as to block the magnetic fluxes φd. It is consequently understood that inverse saliency (Lq>Ld) is satisfied also in the embodiment.

With the configuration, effects similar to those of the first embodiment can be expected also in the second embodiment. Further, since the number of permanent magnets 5 is small, there is also an effect that the rotor 3 can be manufactured at low cost.

Modifications

The present invention is not limited to the foregoing embodiments but can be variously modified as described below.

(1) Although the claw-teeth-type motor 1 has been described as a motor (electric motor) in the foregoing embodiments, it can be also used as a generator.

(2) Although the magnet torque and the reluctance torque are generated by using the permanent magnets 5 and the interpoles in the foregoing embodiments, the motor can be operated as a synchronous reluctance motor without using the permanent magnets 5. The rotor core in this case has an almost cylindrical shape including recesses and projections in the circumferential direction in accordance with the number of claws, and is constructed so that the reluctance changes by rotation of the rotor core. It is also possible to form interpoles while varying the magnetic permeability in the rotational angle direction.

What is claimed is:

1. The claw-teeth-type rotating electrical machine comprising:
   a rotor in which a plurality of permanent magnets are disposed in a cylindrical surface coaxial with a rotary shaft; and
   a stator comprising an annular stator core disposed coaxially with the rotary shaft, and a coil for magnetizing the stator core,
   wherein the coil is an annular coil obtained by winding a wire annularly,
   the stator core comprises an annular part covering the annular coil, a plurality of claws disposed at equal intervals in an inner radius surface of the annular part and extending in the axial direction, and a plurality of magnetic gaps formed between the neighboring claws,
   the number of the claws is equal to the number of permanent magnets, and
   magnet flux in a direction orthogonal to a center axis direction at right angles in electric angle is larger than magnetic flux in the center axis direction generated between neighboring permanent magnets,
   wherein the permanent magnet is disposed in a position of blocking the magnetic flux in the center axis direction of the magnetic pole of the permanent magnet.

2. The claw-teeth-type rotating electrical machine according to claim 1, wherein the annular part has an outer peripheral face and two side faces adjacent to the outer peripheral face, and
   the plurality of claws project alternately from both sides of an inner radius part of the stator core and extend in the axial direction so as to engage with each other.

3. The claw-teeth-type rotating electrical machine according to claim 1, wherein the stator core is formed by compacting insulating-coated iron powder.

4. The claw-teeth-type rotating electrical machine according to claim 1, wherein the rotor is formed by integrally compacting magnet powder and iron powder.

5. The claw-teeth-type rotating electrical machine comprising:
   a rotor comprising a rotor core coaxial a rotary shaft; and
   a stator comprising an annular stator core disposed coaxially with the rotary shaft, and a coil for magnetizing the stator core,
   wherein the coil is an annular coil obtained by winding a wire annularly, and
   the stator core comprises an annular part covering the annular coil, a plurality of claws disposed at equal intervals in an inner radius surface of the annular part and extending in the axial direction, and a plurality of magnetic gaps formed between neighboring claws,
   wherein, in the rotor, a plurality of permanent magnets are disposed in a cylindrical surface coaxial with the rotary shaft, the number of permanent magnets is half of the number of the claws, interpoles comprised of a metal are disposed between neighboring permanent magnets in the rotor core, and the polarity of the permanent magnets is the same in a circumferential direction.

6. The claw-teeth-type rotating electrical machine according to claim 5, wherein the rotor comprises a cylindrical rotor core, and a plurality of permanent magnets disposed on an outer peripheral surface of the rotor core, and the interpoles are formed by the rotor core.

7. The claw-teeth-type rotating electrical machine according to claim 5, wherein in the rotor, a plurality of permanent magnets are disposed on an outer peripheral surface of the cylindrical rotor core, the metal interpoles are formed at equal intervals along a circumferential direction on the outer periphery of the rotor core between the neighboring permanent magnets, and opposite polarities of the permanent magnets are alternately arranged along the circumferential direction.

* * * * *